United States Patent
Verkama et al.

(12) United States Patent
(10) Patent No.: US 6,628,950 B2
(45) Date of Patent: *Sep. 30, 2003

(54) RESTRICTION OF INCOMING CALLS IN A MOBIL TELECOMMUNICATION SYSTEM

(75) Inventors: Markku Verkama, Espoo (FI); Serge Haumont, Helsinki (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/387,704

(22) Filed: Aug. 17, 1999

(65) Prior Publication Data

US 2003/0114160 A1 Jun. 19, 2003

Related U.S. Application Data

(63) Continuation of application No. PCT/FI98/00175, filed on Feb. 26, 1998.

(30) Foreign Application Priority Data

Mar. 4, 1997 (FI) .................................................. 970913

(51) Int. Cl.[7] ................................................ H04Q 7/38
(52) U.S. Cl. .................... 455/445; 455/432.1; 455/433; 455/528
(58) Field of Search ................................. 455/445, 432, 455/433, 440, 422, 414, 415, 417, 517, 528, 565; 370/448

(56) References Cited

U.S. PATENT DOCUMENTS 5,467,381 A * 11/1995 Peltonen et al. ......... 455/433 X
5,473,671 A * 12/1995 Partridge, III .............. 455/445
5,550,904 A    8/1996 Andruska et al. ........... 379/127
5,579,375 A * 11/1996 Ginter ..................... 455/433 X
5,668,856 A    9/1997 Nishimatsu et al. .......... 379/84
5,815,808 A *  9/1998 Valentine .................... 455/422
5,832,382 A * 11/1998 Alperovich .................. 455/433
5,881,105 A *  3/1999 Balachandran et al. ..... 370/498
5,884,179 A *  3/1999 Patel .......................... 455/445
6,081,731 A *  6/2000 Boltz et al. .................. 455/565

FOREIGN PATENT DOCUMENTS

| EP | 675663 A2 | 10/1995 |
| EP | 0676884 | 10/1995 |
| EP | 0788287 | 8/1997 |
| WO | WO 9620554 | 7/1996 |
| WO | WO 96/20574 | 7/1996 |
| WO | WO 9708912 | 3/1997 |
| WO | WO 9730559 | 8/1997 |
| WO | WO 9825430 | 6/1998 |

* cited by examiner

Primary Examiner—Nay Maung
Assistant Examiner—Philip J. Sobutka
(74) Attorney, Agent, or Firm—Squire, Sanders & Dempsey L.L.P.

(57) ABSTRACT

In some mobile telecommunications systems reception of calls outside the home network may be very expensive for the called subscriber. For this reason, subscribers are given the possibility to bar incoming calls when roaming outside the home network. On the other hand, when using optimised routing, reception of calls even far from the home network may be very advantageous or even free. Hereby there are no longer any grounds for barring incoming calls. A method is presented in this invention where those network elements can be defined for the subscriber on a location information basis from which incoming calls will be relayed to the subscriber.

15 Claims, 10 Drawing Sheets

| visitor location register VLRB | allowed GMSCAs of subscriber A ALLOWED-ADDR(VLRB) | | |
|---|---|---|---|
| | class 1 | class 2 | class 3 |
| +46 705 * | +46 705 * | +46 * | +358 40 * <br> +46 * <br> +47 90 * <br> +47 20 * |
| +46 707 * | +46 707 * | +46 * | +358 40 * <br> +46 * <br> +47 90 * <br> +47 20 * |
| +46 708 * | +46 708 * | +46 * | +358 40 * <br> +46 * <br> +47 90 * <br> +47 20 * |
| **+47 90 *** | **+47 90 *** | **+47 *** | **+358 40 * <br> +46 705 * <br> +46 707 * <br> +46 708 * <br> +47 *** |
| +47 20 * | +47 20 * | +47 * | +358 40 * <br> +46 705 * <br> +46 707 * <br> +46 708 * <br> +47 * |
| +358 40 * | +358 40 * | +358 * | +358 * <br> +46 705 * <br> +46 707 * <br> +46 708 * <br> +47 90 * <br> +47 20 * |

RESTRICTION OF INCOMING CALLS IN A MOBIL TELECOMMUNICATION SYSTEM

This application is a continuation of international application number PCT/FI98/00175, filed Feb. 26, 1998, pending.

FIELD OF THE INVENTION

This invention relates to management of barring of incoming calls in a mobile telecommunications system.

BACKGROUND OF THE INVENTION

Figure 1:
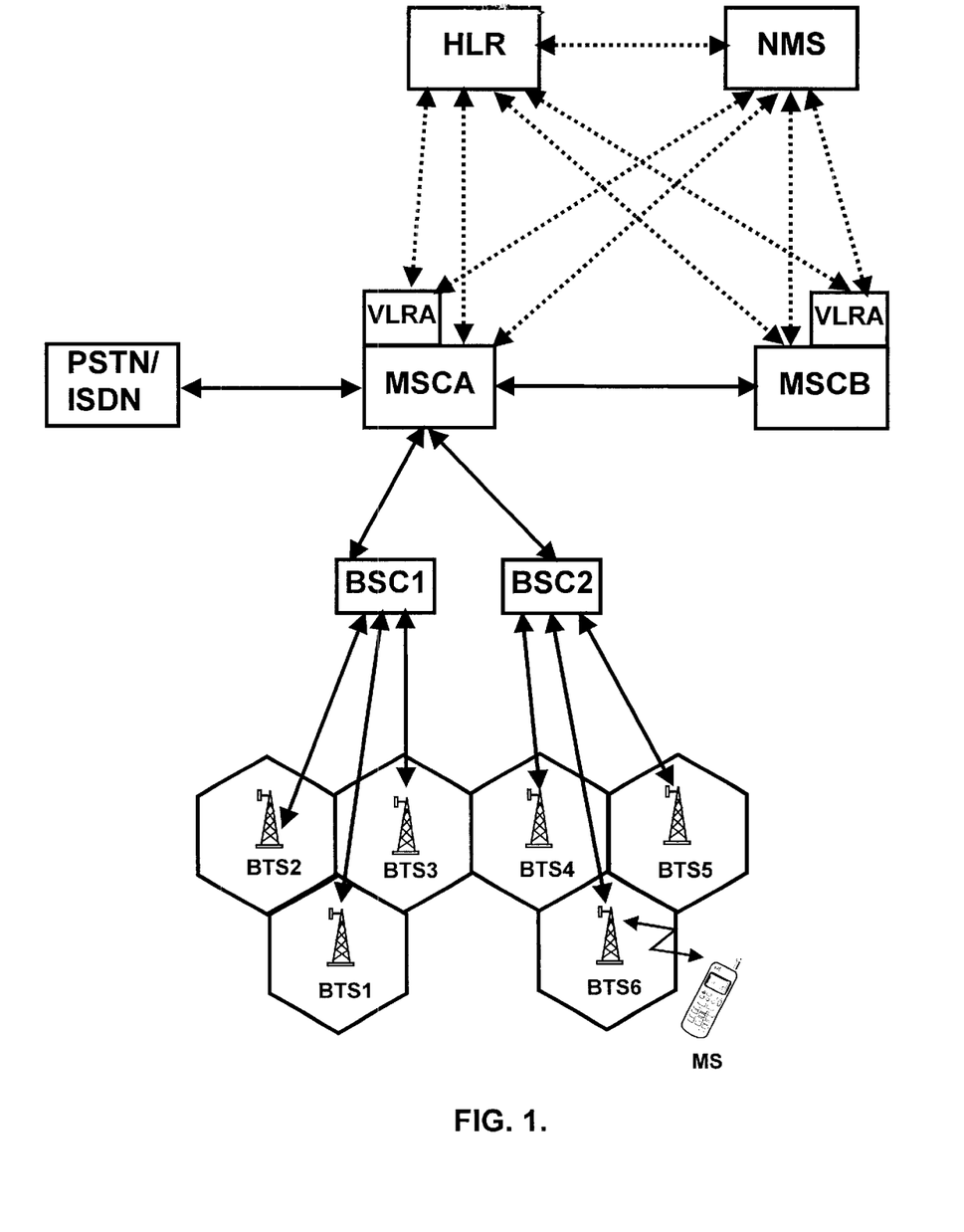
FIG. 1 shows the network topology of a state-of-the-art cellular radio network.

FIG. 1 shows network elements and their mutual relations in connection with routing of a call in a known mobile telecommunications network PLMN (Public Land Mobile Network). The presented network is in accordance with the GSM system used as an example in this example. In this connection, a network means a mobile telecommunications network operated by one operator. The solid lines in the figure depict connections comprising both signalling and call connection whereas dashed lines depict such connections which comprise signalling only. The network includes base transceiver stations BTS able via a radio path to set up connections with mobile stations MS of mobile subscribers, base station controllers BSC controlling base transceiver stations and mobile services switching centres MSC. Under the MSC in the hierarchy there are typically several base station controllers BSC, while under these there are several base transceiver stations BTS. The call connections which have been set up pass from base transceiver station BTS via the base station controller BSC to the mobile services switching centre MSC, which connects calls either back to base station controllers under itself, to other mobile services switching centres MSC or to a fixed public switched telephone network PSTN or integrated services digital network ISDN. In addition, the network includes a network management system NMS which may be used for collecting information on the network state and for supplying information and programmes to other network elements.

It is characteristic of mobile telecommunications networks that the geographic location of mobile stations may change. For this reason, the network must maintain information on the locations of mobile subscribers. In the network of FIG. 1, this information is distributed to a home location register HLR and to visitor location registers VLR located in connection with mobile services switching centres MSC. The HLR, which is always in the subscriber's own home network, contains unchanging subscriber information and information on the subscriber's location with VLR precision. Information on the subscriber's reachability and on the more precise location with so-called location area precision is stored in the VLR located in connection with the subscriber's current mobile services switching centre VMSC.

Figure 2:
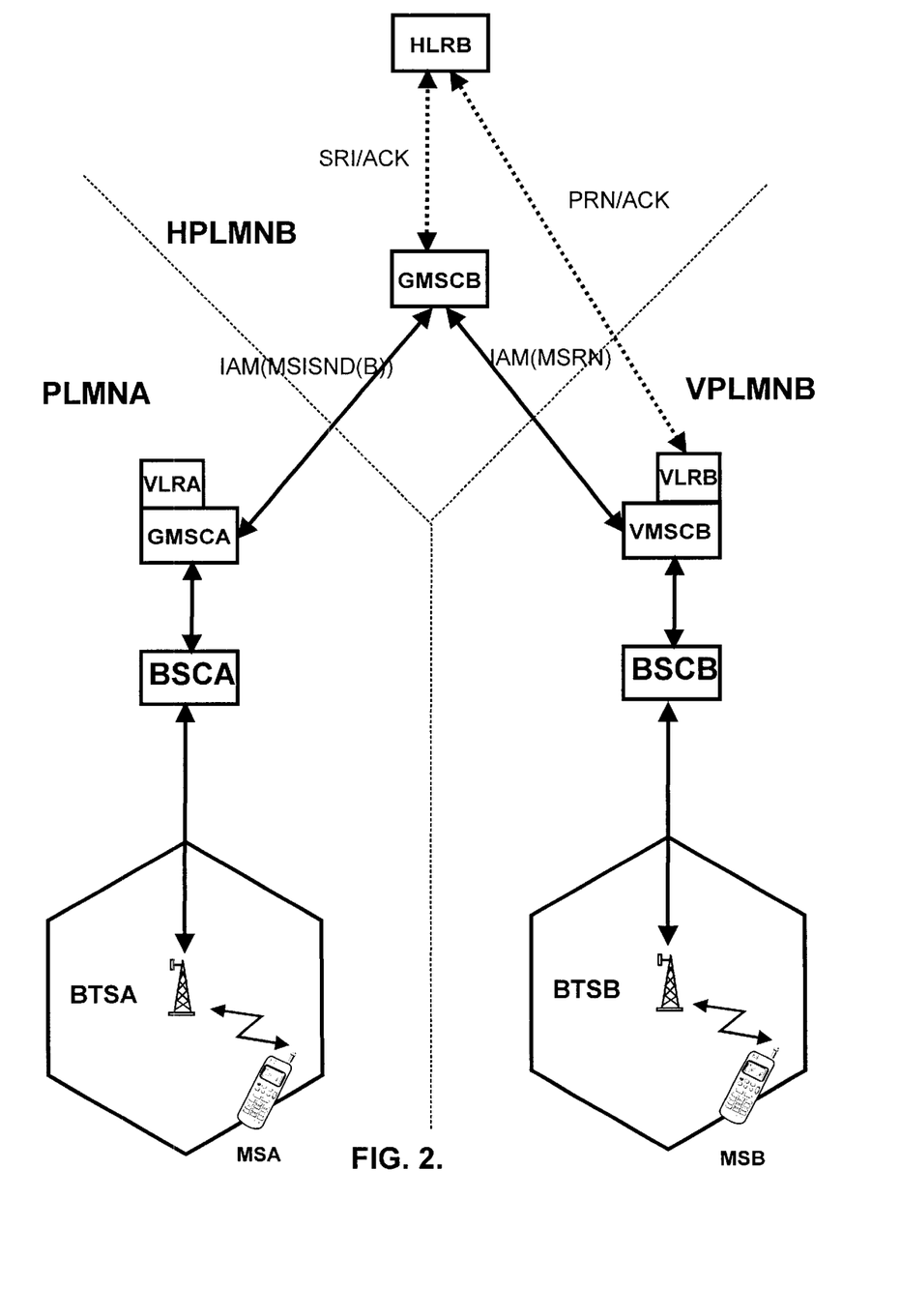
FIG. 2 shows routing of a call when normal routing is used.

FIG. 2 shows routing of a call. The figure names calling subscriber A's home network PLMNA, called subscriber B's home network HPLMNB and network VPLMNB visited by subscriber B. PLMNA, HPLMNB and VPLMNB may all be the same network operated by one operator (internal call of one operator) or networks operated by two or three different operators. The figure shows a case where subscriber A too is a mobile subscriber. If subscriber A is a fixed network subscriber, routing is exactly similar, but the GMSCA (Gateway MSCA) of subscriber A in the figure will be replaced with the GE (Gateway Exchange) of the fixed network.

Figure 3:
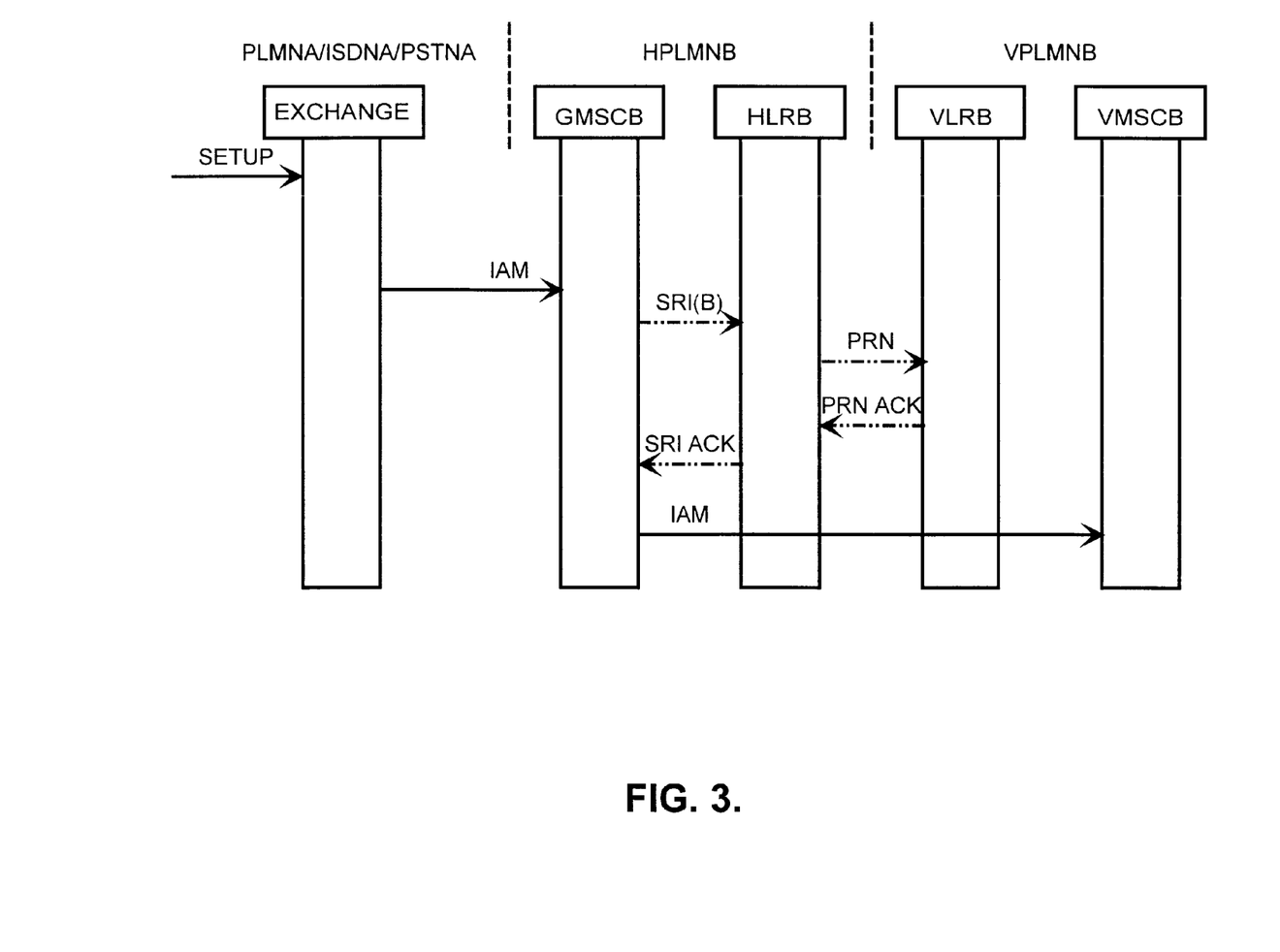
FIG. 3 shows state-of-the-art signalling when using normal routing.

FIG. 3 shows the signalling required when setting up a call. When setting up a call terminating in mobile station B, a connection is first set up with an initial address message IAM based on subscriber B's subscriber number MSISDN (B) with the GMSCB (Gateway MSCB). The GMSCB asks for routing information from subscriber B's home location register HLRB with SRI (Send_Routing_Info). Having received Send_Routing_Info, the HLRB performs a subscriber information check which is described more closely hereinafter. If no barrier to the incoming call is found in the subscriber information check, the HLRB will request the MSRN (Mobile Subscriber Roaming Number) from subscriber B's present visitor location register VLRB with PRN (Provide_Roaming_Number). VLRB returns the MSRN number to HLRB in a PRN_ACK message. HLRB relays the MSRN to GMSC by a SRI_ACK message. GMSC sets up a connection with subscriber B's MSCB using the identifying MSRN of called subscriber B.

Payments for calls are determined so that the calling subscriber, that is subscriber A, always pays for that part of the call which is between subscriber A and the home network of the called subscriber, that is subscriber B. The principle is that subscriber A, who does not know the location of subscriber B, will not have to pay any unpredictably high price for the call he makes. When outside his home network or when using a call forwarding service, subscriber B will pay for that part of the call which is forward from his home network. Hence when e.g. subscriber A is in Sweden and calls a New Zealand subscriber in Finland, subscriber A will pay for the part of the call from Sweden to New Zealand, while subscriber B will pay for the part going from New Zealand to Finland.

When far away from his own network, a subscriber may have to pay a considerable price for the calls he receives. For this reason, barring services for incoming calls are defined in GSM. Such services are e.g. BAIC (Barring of All Incoming Calls) and BIC-Roam (Barring of Incoming Calls when Roaming). Information about these barring services is stored in the subscriber's home location register HLR.

Figure 4:
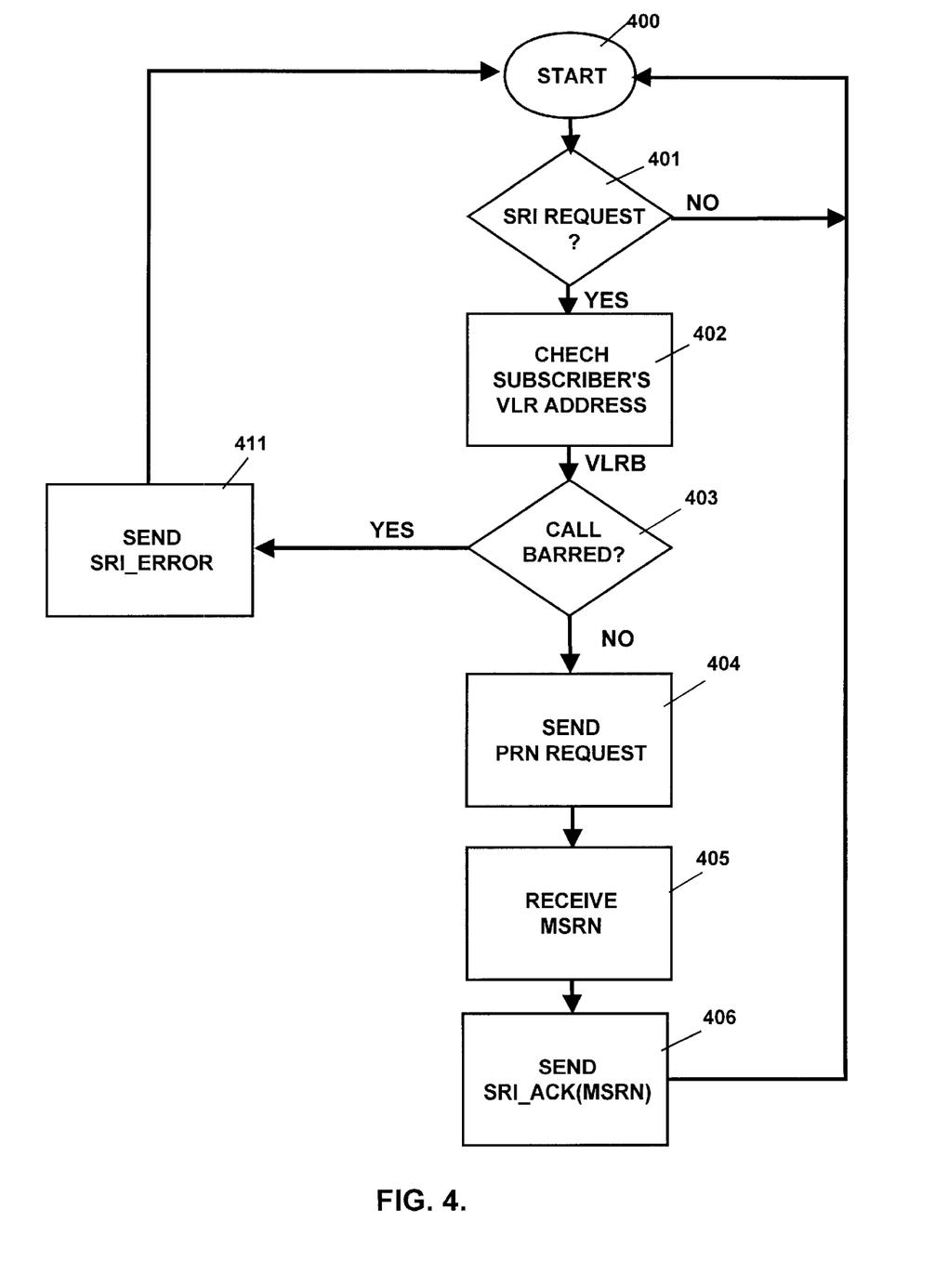
FIG. 4 shows a state-of-the-art home location register function when using normal routing.

The flow chart in FIG. 4 shows a subscriber information check of a call performed by the called subscriber's home location register HLRB. Having received a SRI request (point 401), HLRB will search its database for the address of the called subscriber's current visitor location register VLRB. At point 403 HLRB examines if the call is barred. If the call is not barred, progress will be made to point 404, where a PRN request is sent to VLRB, and the MSRN number received in response to the request is relayed to the exchange which made the routing information inquiry (point 406). If the subscriber has activated barring of incoming calls, HLRB will not send the Provide_Roaming_Number request of the signalling diagram in FIG. 3 to subscriber B's visitor location register VLRB, but will send (point 411) an error message SRI_ERROR to the exhange which made the routing information inquiry SRI, stating barred call as the reason code.

In addition to checking of barring of incoming calls shown in FIG. 4, HLR also checks other matters, such as the existence of the called subscriber, any changes in the subscriber number, unconditional call forwarding to another number, and permission to the requested service. However, these are not essential from the viewpoint of the invention presented in this application, nor are they shown in the figure for this reason.

Figure 5:
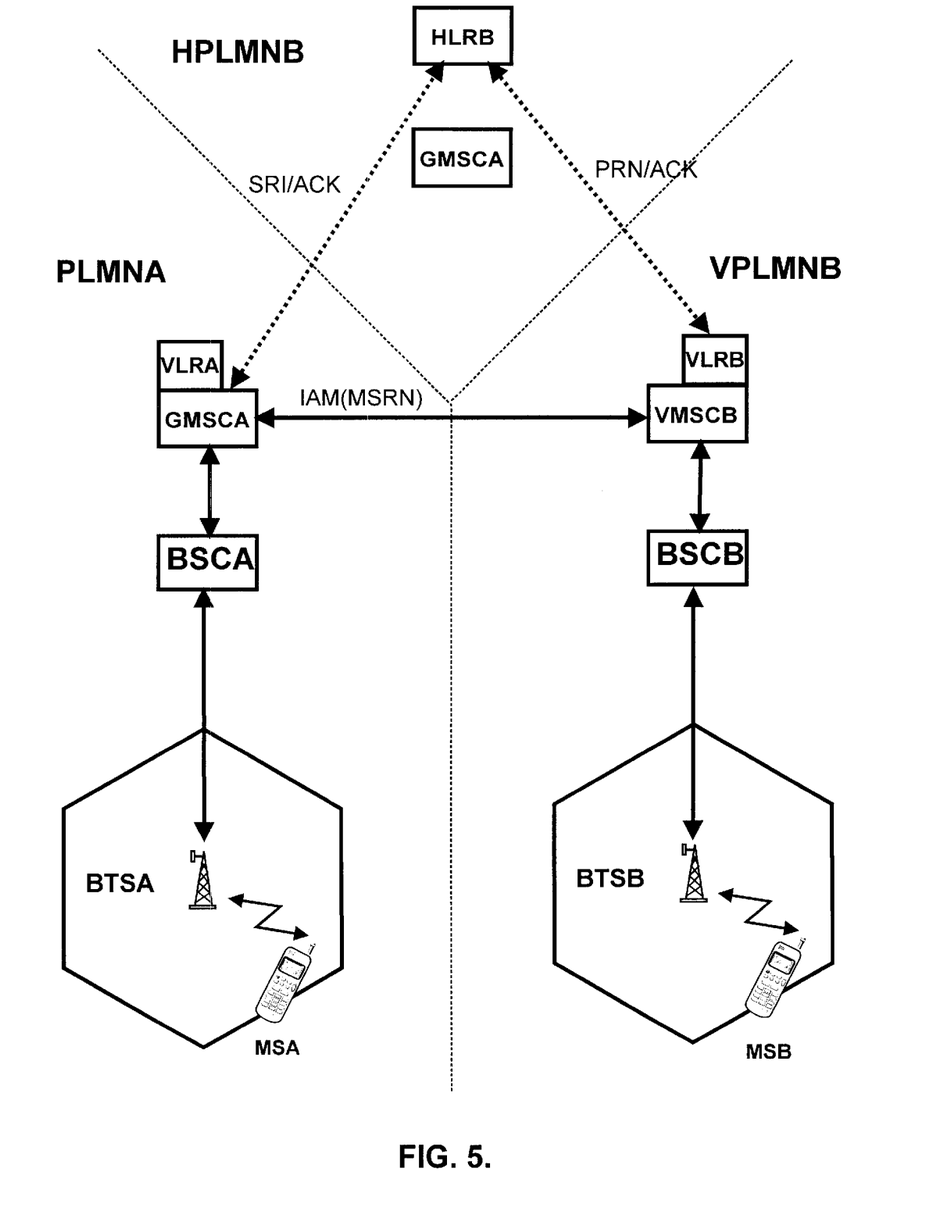
FIG. 5 shows routing of a call when using optimal routing.

ETSI (European Telecommunications Standards Institute) is specifying a so-called optimal routing of calls for the GSM system, besides the normal call routing method presented above. The basic idea of optimal routing of calls is to use the straightest route possible between subscriber A and subscriber B as shown in FIG. 5. The home network of subscriber B does not necessarily take part in the call otherwise than as regards HLR signalling. By using optimal call routing, costs of calls between exchanges or centres can be saved and thus the total price of the call can be reduced.

The MoU (Memorandum of Understanding, the organisation of GSM operators) has imposed two requirements on the implementation of optimal routing:

1. use of optimal routing must not cause any price increase for any user, and
2. one subscriber always pays for one leg of the call at least in the first stage of the service.

Since it can not be assumed that the price of different legs of a call is known in the first stage of optimal routing, optimal routing is used in the first stage of the service only if GMSCA and VMSCB or VMSCB and HLRB are in the same country. The total cost of the call is hereby typically on the same level as a call made to the mobile station inside the same country.

Since optimal routing aims at routing the call using as direct a route as possible, it must be possible to make the HLR request at as early a stage as possible. If subscriber A is a mobile station in accordance with the same mobile telecommunications system as subscriber B, subscriber A's GMSCA which supports optimal routing may make the inquiry. If subscriber A is not a mobile station in accordance with the same system as subscriber B, the call must be routed to such a network element which can make HLR inquiries, e.g. with the aid of pre-dialling agreed upon in advance.

Figure 6:
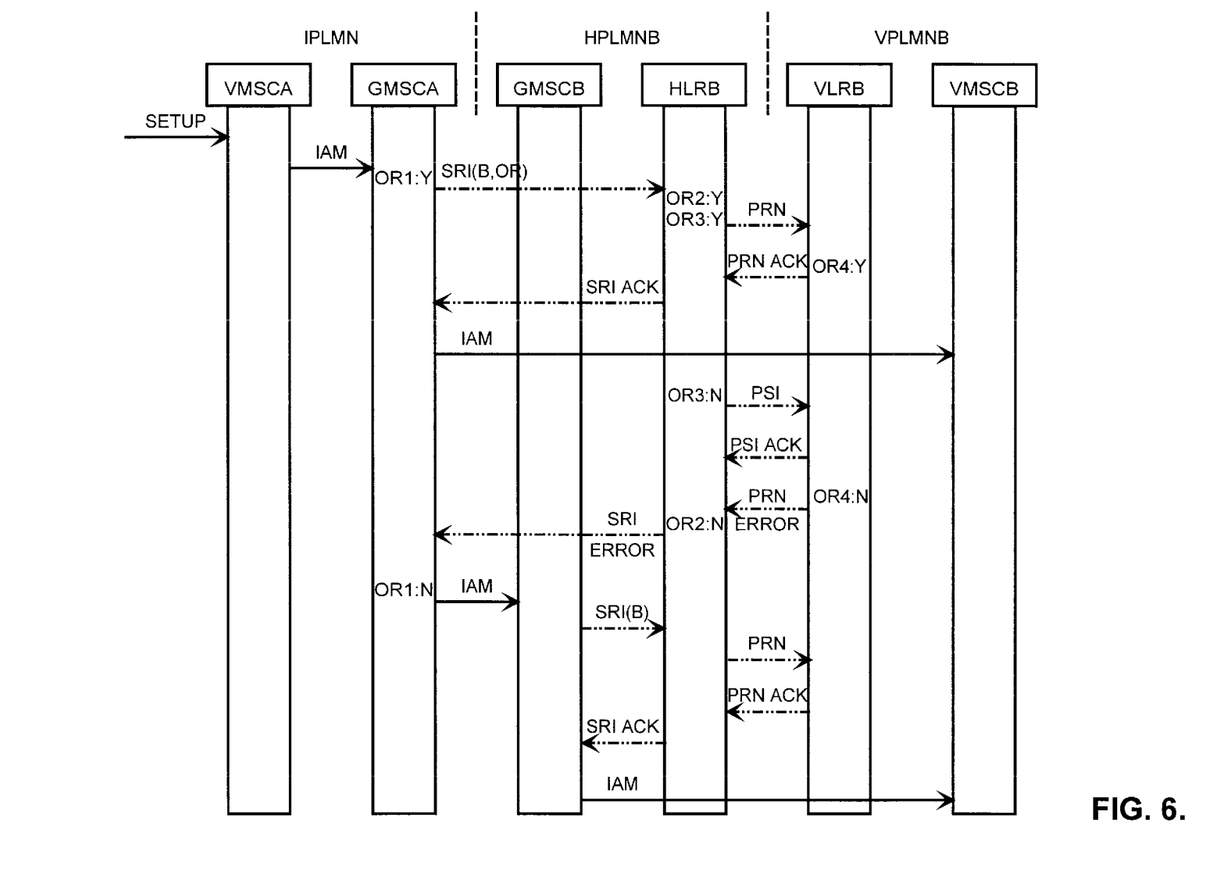
FIG. 6 shows state-of-the-art signalling when using optimal routing.

The setting up of a call using optimal routing will be studied referring to FIG. 6, which shows the signalling used for call setup. GMSCA checks that subscriber B's address belongs to a GSM subscriber, and if GMSCA supports optimal routing (OR1=Y), it sends a Send_Routing_Info request SRI(B,OR) for optimal routing to HLRB. HLRB receives the Send_Routing_Info request. If HLRB supports optimal routing (OR2=Y), it will check if at least one of the following conditions OR3 is fulfilled:

GMSCA is in the same country as VMSCB

HLRB is in the same country as VMSCB.

If at least one condition is met (condition OR3=Y) and no other barriers exist for setting up the call, HLRB will send a PRN request (Provide Roaming Number) to VLRB. From now on conditions OR3 will be changed in such a direction that a call can always be optimally routed, if the call using an optimised route is not more expensive either for subscriber A or for subscriber B than a normally routed call.

If VLRB supports optimal routing (OR4=Y), it will return the roaming number MSRN to HLRB in a PRN_ACK message. HLRB will send the roaming number MSRN to centre GMSCA, which will set up a direct connection with VMSCB with the aid of the MSRN number included in the IAM message.

If any one of conditions OR2, OR3 or OR4 is not fulfilled, HLRB will send an error message SRI_ERROR to GMSCA. If GMSCA receives the said error message or it does not itself support optimal routing (OR1=N), it will set up the call using a normal method as shown in FIG. 3.

Figure 7:
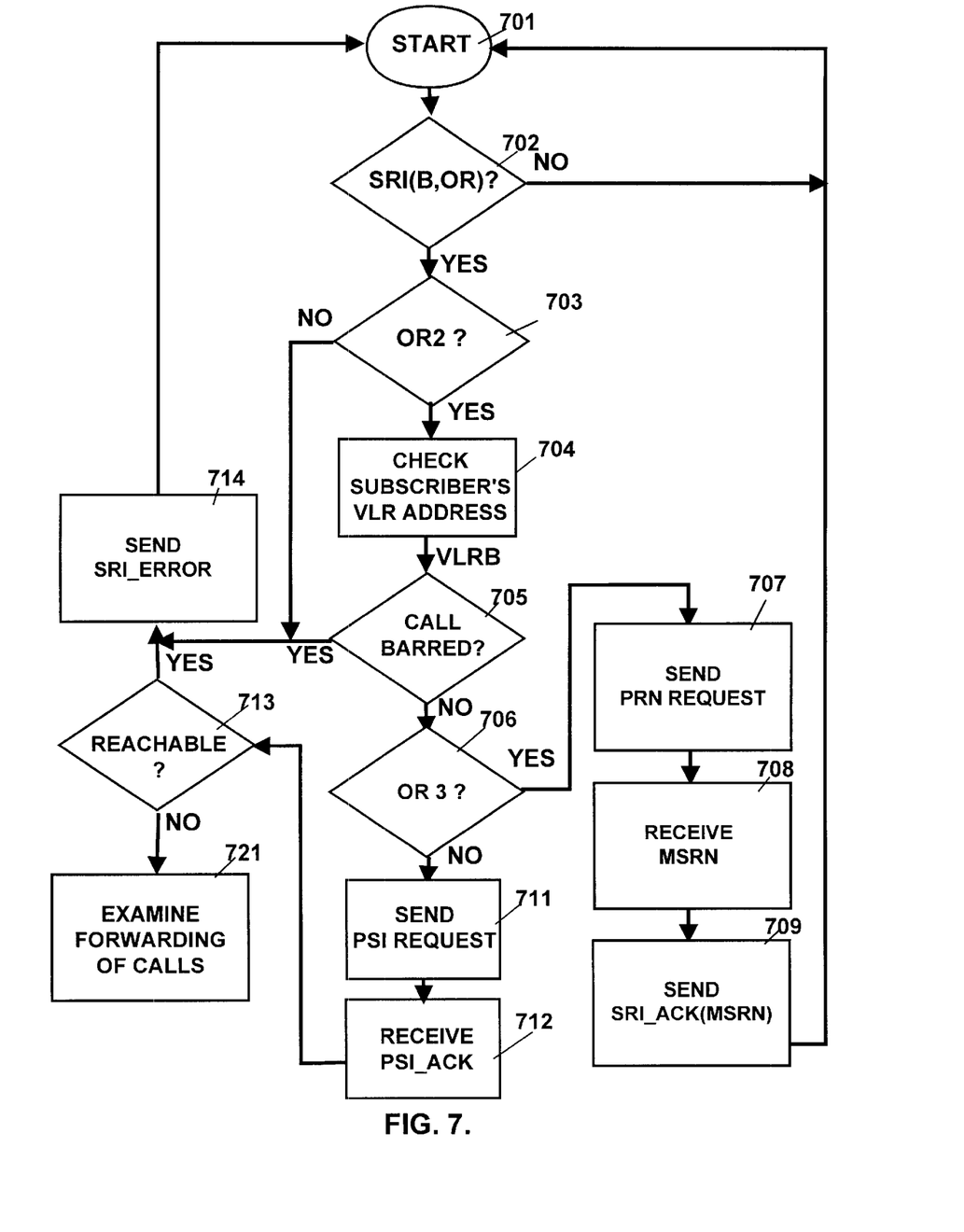
FIG. 7 shows a state-of-the-art home location register function when using optimal routing.

The operation of HLRB in optimal routing as shown in FIG. 7 will now be studied. In addition to the checks shown in the figure, HLR also checks other matters, such as the existence of the called subscriber, any change in the number, unconditional call forwarding to another number, barring of all incoming calls (BAIC) and permission for the requested service. However, these are not essential from the viewpoint of the invention presented in this application, so they will not be presented in the figure.

Having received a routing information request SRI(B,OR) for optimal routing (point 702) HLR which supports optimal routing at point 704 searches its database for the address of subscriber B's visitor location register. A check is made at point 705 of whether the call is barred, e.g. due to any activated BIC-Roam service. If the call is not barred, the above-mentioned condition OR3 for optimal routing will be checked. If OR3=Y, a PRN (Provide Roaming Number) request is sent to VLRB (point 707), and the roaming number MSRN obtained as a result of the request is returned to GMSCA at point 709.

If HLR does not support optimal routing (OR2=N), an error message SRI_ERROR is sent to GMSCA, in response to which GMSCA begins setting up a call using a normal method of call set-up, as shown in FIG. 3. If the call is barred, an error message SRI_ERROR is sent to GMSCA with "call barred" as the reason code, in response to which GMSCA will release the call. If the condition OR3 for optimal routing is not fulfilled, a PSI inquiry (Provide_Subscriber_-Information) is sent to VMSCB, in response to which VMSCB will return information on the subscriber's reachability state. If the subscriber is not reachable, call forwarding CFNRc (Call Forwarding on Not Reachable) defined in the not reachable state is examined, and if the subscriber is reachable, the error message SRI_ERROR is returned to GMSCA. In response to the error message SRI_ERROR, GMSCA will set up the call using normal routing.

If subscriber B MSB is outside his home network with the BIC-Roam service activated, set-up of the call is barred. It is a problem with the state of the art that this is done even if reception of the call would be considerably cheaper for subscriber B than the price of a normally routed call, in several cases even free, owing to optimal routing. However, a reduction of call charges of subscriber B is the basis for the entire BIC-Roam service, so barring of incoming cheap calls is not in accordance with the basic idea of the service. This invention aims at eliminating or at least at reducing this defect in the state of the art. This aim is reached with a method as defined in the independent claims.

BRIEF DESCRIPTION OF THE INVENTION

The inventive idea is to define a set of permissible network elements based on location information of the called subscriber so that calls coming from these elements will be relayed to the called subscriber. Calls coming from outside this set will be barred. In connection with the invention the subscriber's location information can be defined e.g.

as the country, where the subscriber did his latest location update, as the network, to which the subscriber did his latest location update, or as that network element VLR, to which the subscriber did his latest location update.

The set of allowed network elements may be defined e.g. as exchanges, the address of which fulfils a certain condition. Thus it may be determined that e.g. all calls coming from exchanges of the same country or the same operator shall be relayed to the called subscriber. It may also be determined e.g. that calls coming from certain countries or from the exchanges of certain operators shall be relayed.

The invention can be preferably applied together with BIC-Roam barring of incoming calls working outside the home network. With the method according to the invention barring of incoming calls can be bypassed, if reception of the call will cause only minor costs or no costs at all for subscriber B owing to optimal routing.

According to an advantageous embodiment, when the BIC-Roam service is activated only those optimally routed calls are relayed to the subscriber which come from the network where the subscriber is located at the time.

According to another advantageous embodiment, when the BIC-Roam service is activated only those optimally routed calls are relayed to the subscriber which come from the country where the subscriber is located at the time.

The function according to the invention is advantageously embodied in the called subscriber's home location register, where a check according to the invention is added to the checking routines. The calling subscriber's network element and the visitor location register VLRB to which the called subscriber has last done his location update are matters which are examined in the check. The incoming call will be relayed, if the network element of the calling subscriber belongs to the set of network elements determined on a location information basis and per called subscriber, from which incoming calls may be received by the said called subscriber by his own definition.

According to an advantageous embodiment of the invention, the information added to the subscriber's location information which concerns network elements from which the subscriber is prepared to receive incoming calls, is divided into classes. Using a division into classes it is possible on a visitor register basis to determine several sets of networks elements, from which incoming calls will be relayed to their destinations. Hence the subscriber may easily determine a suitable class for himself by choosing to receive those calls, the reception of which will not be too expensive for him.

LIST OF FIGURES

The invention will be described more closely referring to the attached drawings, wherein.

DETAILED DESCRIPTION OF THE INVENTION

Figure 8:
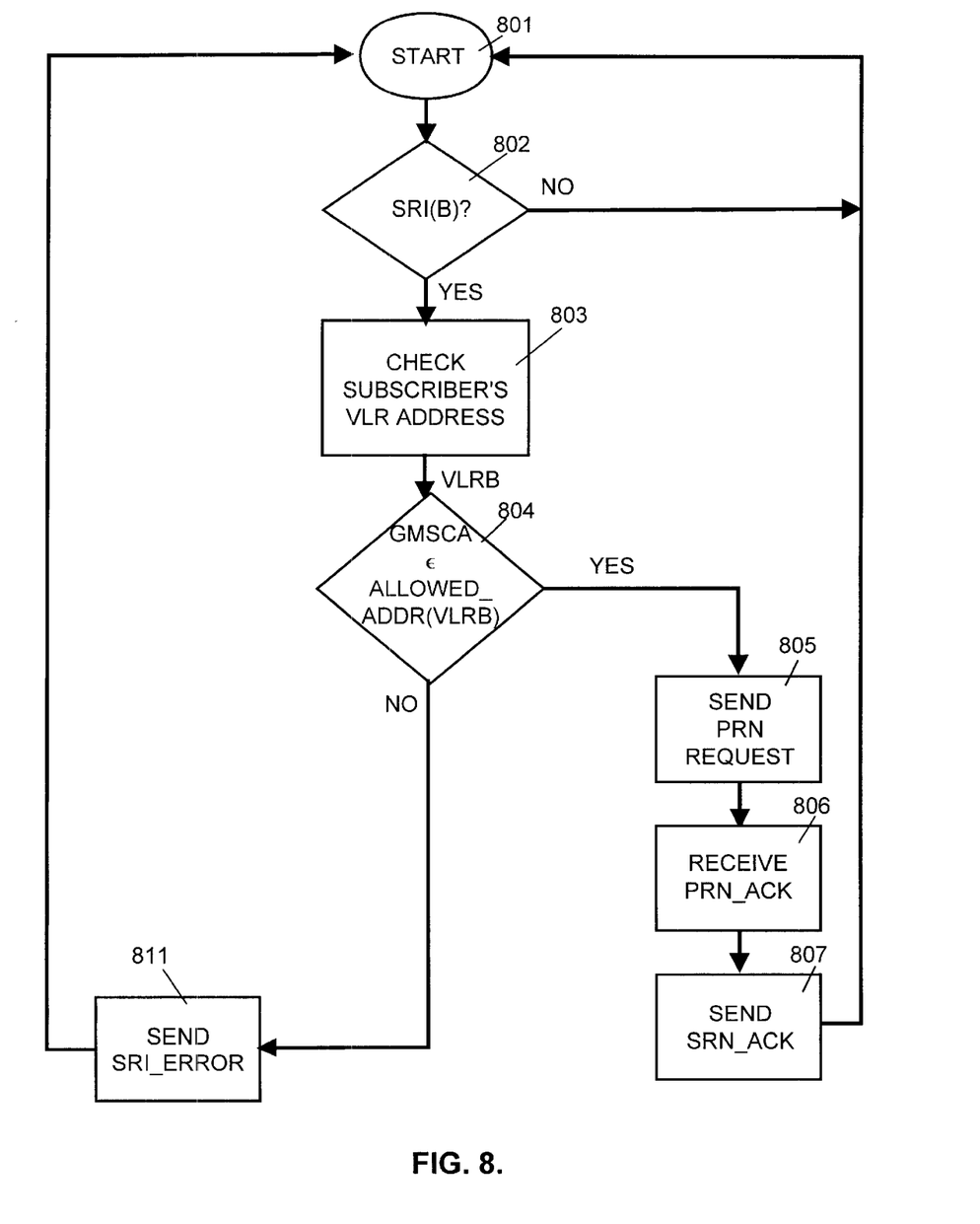
FIG. 8 shows an example of functionality according to the invention as implemented in a home location register.

The operating principle of the invention is presented in the functional diagram of a home location register HLR shown in FIG. 8. On receiving Send_Routing_Info SRI, the HLR will check the called subscriber's location information VLRB at point 803. A check is made at point 804 to find out if the calling subscriber's network element GMSCA belongs to the set ALLOWED_ADDR(VLRB) corresponding to the called subscriber's location information VLRB. The set ALLOWED_ADDR(VLRB) is that set of network elements from which incoming calls are relayed to the subscriber who has done a location update to VLRB. If GMSCA belongs to the set, set-up of the call will be continued in a state-of-the-art manner from point 805. If GMSCA does not belong to the set, set-up of the call will be barred at point 811 by an error message SRI_ERROR which is sent with "call barred" as the reason code to gateway mobile services switching centre GMSCA.

In its simplest form the method can be embodied by defining that incoming calls will be relayed only from that country or network, where the subscriber has made his latest location update. Information on allowed network elements need not then be stored on a location information basis, but it will suffice at the call set-up stage to make a comparison of the location information and the country or network code of the calling subscriber's network element. E.g. in the system of FIG. 8, the comparison at point 804 would compare only the country codes or country and network codes of the gateway mobile services switching centre GMSCA and of visitor location register VLR. If more degrees of freedom are wanted for the definition of the set of allowed network elements, the information on location information based allowed network element sets must be stored in the network.

An advantageous embodiment of the invention will be described in the following. The invention is here applied together with barring of incoming calls operating outside the home network. The method hereby facilitates barring of calls so that despite barring activated by the called subscriber those calls will be relayed to the subscriber which come from a set of predetermined network elements. Since the purpose of activated barring of calls is to avoid high costs of calls caused by incoming calls, the subscriber typically does not wish to receive normally routed calls coming through his home network. For this reason, calls to be relayed must also be optimally routed.

The method according to the invention in combination with BIC-Roam barring of incoming calls outside the home network is implemented in its simplest form by bypassing barring only for calls routed within one country (or network). It should be noted that such a call is always optimally routed. The method can be implemented simply in the called subscriber's home location register by adding to the checkpoint of BIC-Roam service a condition checking the calling subscriber's network element wherein barring of the call is bypassed, if the calling subscriber and the called subscriber are in the same country (or network).

Figure 9:
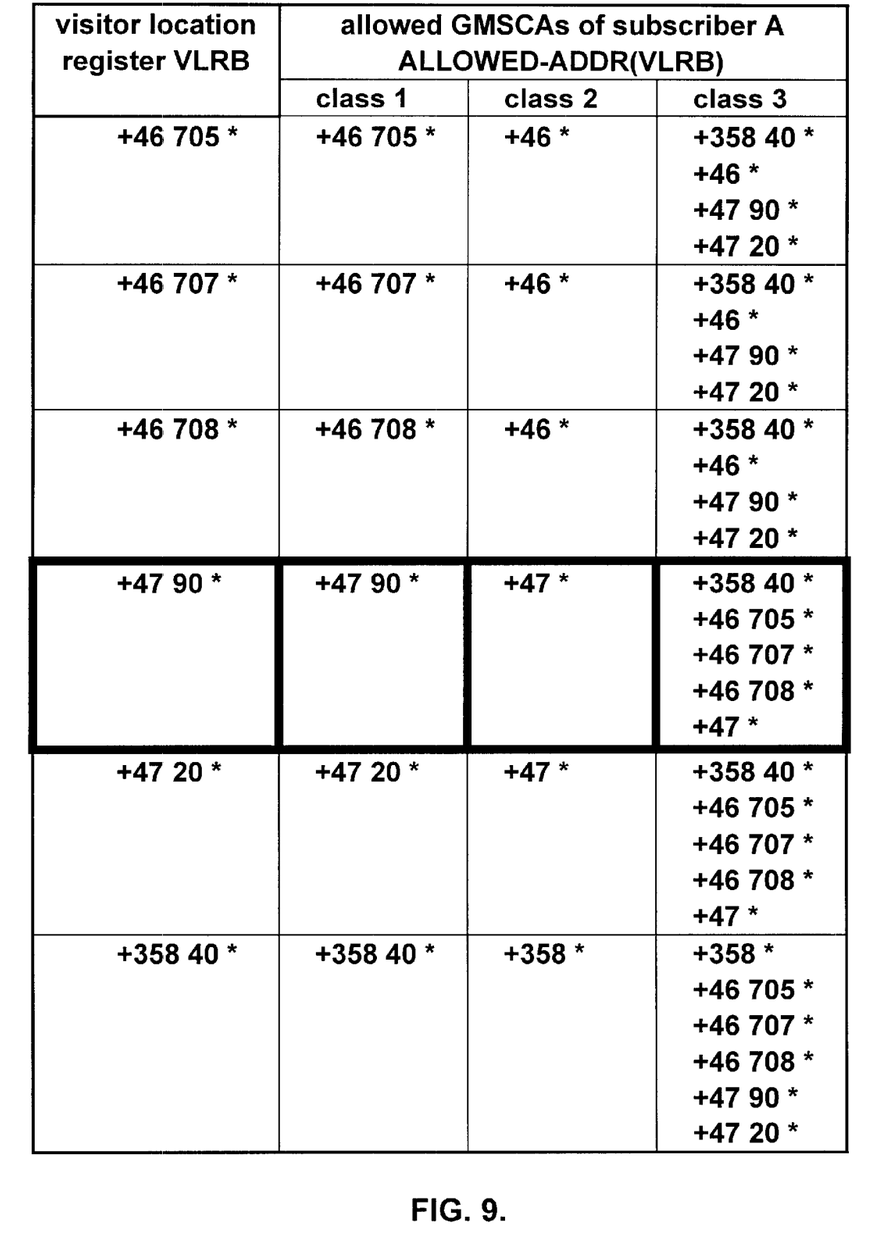
FIG. 9 shows an example of a visitor location register based list of networks according to the invention where barring of incoming calls is bypassed for incoming calls coming from the listed networks.

The following is a study of the operation of an embodiment of the invention given as an example, wherein a New Zealand subscriber with MSISDN number +64 21 123456 is roaming in Norway. The subscriber has activated BIC-Roam barring of incoming calls working outside the home network. In the home location register HLR of the subscriber's operator, the number of which is +64 21 77, three different classes for bypassing of barring are determined according to FIG. 9 for the network of the operator who has made a roaming agreement with the operator of each subscriber's home network. In the table of FIG. 9 there are addresses of the visitor location register VLRB in the left column. The asterisk indicates a so-called wild card, e.g. +46 705* means all those addresses where the first part CC+NDC (Country Code+National Destination Code) is +46 705 (COUNTRY CODE cc=46 AND NETWORK CODE ndc=705). In the remaining three columns representing different classes each one lists a set of first parts of addresses of MSC exchanges or more generally of network elements. The lists define on a VLRB basis the set of those exchanges for which the barring of incoming calls outside the home network is bypassed when incoming and optimally routed calls come from these exchanges.

Let us assume that the New Zealand subscriber in our example has done a location update to visitor location register VLRB, the address of which is +47 90 12, that is, whose CC=47 (country=Norway) and NDC=90 (operator=TelenorMobil AS). Hereby the barring of incoming calls working outside the home network will be bypassed as regards optimally routed calls destined to the subscriber in the following cases:

if class 1 is defined for bypassing of barring for the subscriber, bypassing will be done if the number of subscriber A's exchange begins with +47 90 (that is, the call comes from the network of the same operator), if class 2 is defined for bypassing of barring, bypassing will be done if the number of subscriber A's exchange begins with +47 (that is, the call comes from networks of the same country), and if class 3 is defined for bypassing of barring, bypassing will be done if
the number of subscriber A's exchange begins with +358 40 (that is, the call comes from the network of Finnish Telecom Finland),
the number of subscriber A's exchange begins with +46 705 (that is, the call comes from the network of Swedish Telia Mobitel),
the number of subscriber A's exchange begins with +46 707 (that is, the call comes from the network of Swedish Comvik),
the number of subscriber A's exchange begins with +46 708 (that is, the call comes from the network of Swedish Europolitan) or
the number of subscriber A's exchange begins with +47 (that is, the call comes from networks in the same country).

In an advantageous embodiment of the invention the arrangement according to the invention will not cause any changes in other network elements than in the home location register HLRB of subscriber B. In addition, it must of course be possible with the network management system NMS to form and transfer to home location register HLRB such information according to the invention and relating to the location of the mobile station information which concerns those network elements from which incoming and optimally routed calls to subscriber B must be routed.

Figure 10:
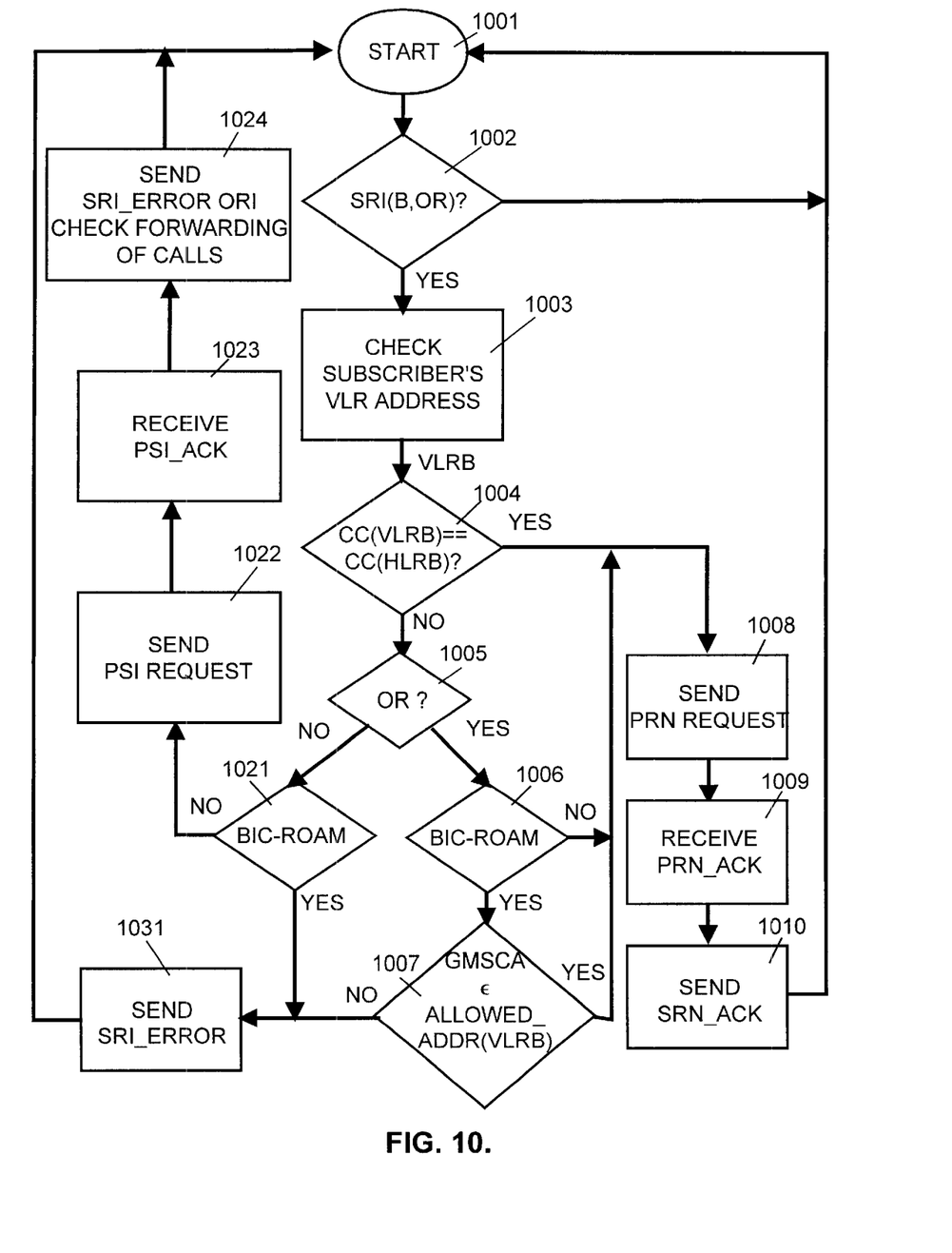
FIG. 10 shows another example of functionality according to the invention as implemented in a home location register.

FIG. 10 shows an example of operation according to the invention in a HLRB supporting optimal routing. Having received Send_Routing_Info SRI(B, OR) for optimal routing (point 1002), HLR first checks the address of the subscriber's current visitor location register VLRB (point 1003). The next check (point 1004) is to find out whether the visitor location register is in the same country as the HLRB itself. If the result of the check is positive, the condition for optimal routing is also fulfilled. Hereby optimal routing is continued to point 1008, where Provide Roaming Number PRN is sent to VLRB.

Only those situations are of significance to the present invention where the subscriber is outside his home network, that is, situations where progress is from point 1004 to the NOT branch. A check is made in point 1005 of whether the condition for optimal routing is fulfilled. At the first stage of optimal routing a check is made in point 1005 of whether subscriber A's gateway mobile services switching centre GMSCA is in the same country as subscriber B's visitor location register VLRB. If the condition is fulfilled, a check is made (point 1006) of whether BIC-Roam barring of incoming calls outside the home network is activated. If BIC-Roam is not activated, optimal routing is continued in a state-of-the-art manner by proceeding to point 1008. If BIC-Roam is activated, the function proceeds to point 1007, where a check is made according to the invention of whether the established barring of incoming calls can be bypassed. The check compares the address of subscriber A's GMSCA which has sent the routing information request with subscriber B's visitor location register-based register ALLOWED_-ADDR(VLRB) which is stored in HLRB according to FIG. 9. The register contains information on those network elements for which barring of incoming calls outside the home network can be bypassed when the calls come from these network elements. If the address of GMSCA is found on the list of subscriber B's visitor location register VLRB, the call may be routed to subscriber B. Hereby the function proceeds to point 1008, where Provide Roaming Number PRN is sent to VLRB. VLRB responds by sending the roaming number MSRN, which is relayed in the SRI_ACK message to subscriber A's gateway mobile services switching centre GMSCA which made the routing information inquiry.

It can be seen in point 1009 that subscriber B's visited network PLMNB (and subscriber B's visitor location register VLRB) does not support optimal routing. If BIC-Roam has been bypassed due to optimal routing, an error message SRI_ERROR with call barred as the reason code is hereby returned to GMSCA.

If it is found in the check at point 1007 that GMSCA is not found on the list of VLRB according to FIG. 9, the operation will proceed to point 1031, where the call is barred.

If it is found at point 1005 that the conditions for optimal routing are not fulfilled, the operation will proceed from point 1005 to point 1021. The activity of the BIC-Roam service is checked at this point. If BIC-Roam is active, the function will proceed to point 1031, where the call is barred. If it is found in the check at point 1021 that BIC-Roam is not activated, a Provide Subscriber Info PSI inquiry is sent in a state-of-the-art manner to VLRB. In response to the subscriber info inquiry (point 1023), VLR returns the information on whether subscriber B is not reachable for the network. If subscriber B can not be reached, call forwardings will be studied (not in the figure). Otherwise the error message SRI_ERROR will be returned to GMSCA, in response to which GMSCA will set up a connection with subscriber B's GMSCB.

In addition to the checks shown in FIG. 10, HLR also checks other matters, such as the existence of the called subscriber, any change in the number, unconditional call forwarding to another number, barring of all incoming calls (BAIC) and permission of the requested service. However, these are not essential to the invention presented in this application, so they are not shown in the figure.

The operation of HLRB in different cases is studied in the following. It is assumed in the examples that all network elements support optimal routing.

Such situations are studied first where the subscriber's class defined for bypassing of barring is class 1. Hereby according to information stored in the table in FIG. 9, incoming calls are barred if the address of subscriber A's GMSCA exchange does not begin with +47 90. Only calls routed within of the same operator's network are thus allowed in this class.

A situation is examined where an attempt is made to make a call to the subscriber from a network of the same Norwegian operator from mobile services switching centre GMSCA, the number of which is +47 90 22. GMSCA sends Send_Routing_Info SRI(B, OR) for optimal routing to HLRB +64 21 77 based on a number analysis which it has done of subscriber B's number. HLRB receives the request and begins executing the function according to FIG. 10. It is noted at point 1003 that subscriber B has done a location update to the visitor location register +47 90 12. It is noted in the check made at point 1004 that GMSCA is not in the same country as HLRB, so the operation proceeds to point 1005. Condition 1005 for optimal routing is fulfilled, so the operation proceeds to point 1006, where it is noted that the BIC-Roam service is activated. Thus the operation proceeds to point 1007, where it is noted according to barring class 1 in the table of FIG. 9 that incoming calls are allowed to VLRB from exchanges whose number begins with +47 90. GMSCA fulfils this condition. The function thus proceeds to points 1008, 1009 and 1010, where a roaming number is requested from VLRB which is relayed to GMSCA. GMSCA routes the call directly to subscriber B.

A situation is studied in the following where the subscriber's barring bypassing class is 1 and an attempt is made to call the subscriber from the network of another Norwegian operator from mobile services switching centre GMSCA, the number of which is +47 20 22. GMSCA sends Send_Routing_Info SRI(B, OR) for optimal routing to HLRB +64 21 77 based on a number analysis it has made of subscriber B's number. HLRB receives the request and begins executing the function according to FIG. 10. It is noted at point 1003 that subscriber B has done a location update to visitor location register +47 90 12. It is noted in the check at point 1004 that GMSCA is not in the same country as HLRB, so the function proceeds to point 1005. The condition 1005 for optimal routing is fulfilled, so the function proceeds to point 1006, where it is noted that the BIC-Roam service is activated. The function thus proceeds to point 1007, where it is noted in accordance with barring class 1 of the table in FIG. 9 that incoming calls are not allowed to VLRB from exchange +47 20 22. The function thus proceeds to point 1031, where the call is barred by sending to GMSCA an error message SRI_ERROR with "call barred" as the reason code. Having received this message, GMSCA will discontinue set-up of the call. The outcome is the same for any call to be made from Finland from centre +358 40 11.

Such situations are examined in the following where the subscriber's defined barring bypassing class is 2. Hereby incoming calls in accordance with the table in FIG. 9 will be barred, if the address of subscriber A's centre GMSCA does not begin with +47. Calls that can be routed within the same country are thus allowed in this class.

Such a situation is again studied first where an attempt is made to call the subscriber from the mobile services switching centre GMSCA, the number of which is +47 90 22, from the network of the same Norwegian operator. GMSCA sends Send_Routing_Info SRI(B, OR) for optimal routing to HLRB +64 21 77 based on a number analysis which it has made of subscriber B's number. HLRB receives the request and begins executing a function in accordance with FIG. 10. It is noted at point 1003 that subscriber B has done a location update to visitor location register +47 90 12. It is noted in a check made at point 1004 that GMSCA is not in the same country as HLRB, so the function will proceed to point 1005. Condition 1005 for optimal routing is fulfilled, so the function proceeds to point 1006, where it is noted that the BIC-Roam service is activated. The function thus proceeds to point 1007, where it is noted in accordance with barring class 2 from the table in FIG. 9 that incoming calls are allowed to VLRB from exchanges having a number beginning with +47. GMSCA fulfils this condition, so the function proceeds to points 1008, 1009 and 1010, where a roaming number is requested from VLRB and the roaming number is relayed to GMSCA. GMSCA routes the call directly to subscriber B.

Such a situation is again studied next where an attempt is made to call the subscriber from the network of another Norwegian operator from mobile services switching centre GMSCA, the number of which is +47 20 22. The subscriber's barring bypassing class is still 2. GMSCA sends Send_Routing_Info SRI(B, OR) for optimal routing to the called subscriber's home location register HLRB +64 21 77 based on a number analysis it has made of subscriber B's number. HLRB receives the request and begins executing the function according to FIG. 10. It is noted at point 1003 that subscriber B has done a location update to visitor location register +47 90 12. It is noted in the check made at point 1004 that GMSCA is not in the same country as HLRB, so the function proceeds to point 1005. Condition 1005 for optimal routing is fulfilled, so the function proceeds to point 1006, where it is noted that the BIC-Roam service is activated. The function thus proceeds to point 1007, where it is noted in accordance with barring class 2 from the table in FIG. 9 that incoming calls are allowed to VLRB from exchanges having numbers beginning with +47. GMSCA fulfils this condition, so the function proceeds to points 1008, 1009 and 1010, where a roaming number is requested from VLRB which roaming number is relayed to GMSCA. GMSCA routes the call directly to subscriber B.

Such a situation is also studied where an attempt is made to call the subscriber from the network of a Finnish operator from mobile services switching centres GMSCA, the number of which is +358 40 11, and bypassing of barring is in class 2 for the subscriber. GMSCA sends Send_Routing_Info SRI (B, OR) for optimal routing to HLRB +64 21 77 based on a numerical analysis it has made of subscriber B's number. HLRB receives the request and begins carrying out the function according to FIG. 10. It is noted at point 1003 that subscriber B has done a location update to visitor location register +47 90 12. It is noted at point 1004 that GMSCA is not in the same country as HLRB, so the function proceeds to point 1005. It is assumed here that such a procedure is used in HLRB which also allows optimal routings between two countries if the conditions specified by MoU and presented in the beginning of the application are fulfilled. Condition 1005 for optimal function is hereby fulfilled, so the function proceeds to point 1006, where it is noted that the BIC-Roam service is activated. The function thus proceeds to point 1007, where it is noted in accordance with barring class 2 from the table in FIG. 9 that incoming calls are not allowed to VLRB from the exchange +358 40 11. The function thus proceeds to point 1031, where the call is barred by sending to GMSCA a SRI_ERROR message with "call barred" as the reason code. Having received this message GMSCA discontinues set-up of the call.

Such a case will finally be studied where the subscriber's class of bypassing of barring is 3. According to the information to be stored in the table of FIG. 9, barring of incoming calls is hereby bypassed, if the address of subscriber A's GMSCA exchange begins with the following series of numbers: +47, +46 705, +46 707, +46 708 or +358 40.

Such a situation is again studied first where an attempt is made to call the subscriber from the mobile services switching centre GMSCA, the number of which is +47 90 22, from the network of the same Norwegian operator. GMSCA sends Send_Routing_Info SRI(B, OR) for optimal routing to HLRB +64 21 77 based on a number analysis which it has made of subscriber B's number. HLRB receives the request and begins executing a function in accordance with FIG. 10. It is noted at point 1003 that subscriber B has done a location update to visitor location register +47 90 12. It is noted in a check made at point 1004 that GMSCA is not in the same country as HLRB, so the function will proceed to point 1005. Condition 1005 for optimal routing is fulfilled, so the function proceeds to point 1006, where it is noted that the BIC-Roam service is activated. The function thus proceeds to point 1007, where it is noted in accordance with barring class 3 from the table in FIG. 9 that incoming calls are allowed to VLRB from exchanges having a number beginning with +47. GMSCA fulfils this condition, so the function proceeds to points 1008, 1009 and 1010, where a roaming number is requested from VLRB and the roaming number is relayed to GMSCA. GMSCA routes the call directly to subscriber B.

Such a situation is studied next where an attempt is made to call the subscriber from the network of another Norwegian operator from mobile services switching centre GMSCA, the number of which is +47 20 22, and the subscriber's barring bypassing class is 3. GMSCA sends Send_Routing_Info SRI(B, OR) for optimal routing to HLRB +64 21 77 based on a number analysis it has made of subscriber B's number. HLRB receives the request and begins executing the function according to FIG. 10. It is noted at point 1003 that subscriber B has done a location update to visitor location register +47 90 12. It is noted in the check made at point 1004 that GMSCA is not in the same country as HLRB, so the function proceeds to point 1005. Condition 1005 for optimal routing is fulfilled, so the function proceeds to point 1006, where it is noted that the BIC-Roam service is activated. The function thus proceeds to point 1007, where it is noted in accordance with barring class 3 from the table in FIG. 9 that incoming calls are allowed to VLRB from exchanges having numbers beginning with +47. GMSCA fulfils this condition, so the function proceeds to points 1008, 1009 and 1010, where a roaming number is requested from VLRB which roaming number is relayed to GMSCA. GMSCA routes the call directly to subscriber B.

Such a situation is still studied where an attempt is made to call a subscriber, whose barring bypass class is 3, from the network of a Finnish operator from mobile services switching centres GMSCA, the number of which is +358 40 11. GMSCA sends Send_Routing_Info SRI (B, OR) for optimal routing to HLRB +64 21 77 based on a number analysis it has made of subscriber B's number. HLRB receives the request and begins executing the function according to FIG. 10. It is noted at point 1003 that subscriber B has done a location update to visitor location register +47 90 12. It is noted in a check made at point 1004 that GMSCA is not in the same country as HLRB, so the function proceeds to point 1005. It is assumed here that such a procedure is used in HLRB which also allows optimal routings between two countries if the conditions specified by MoU and presented in the beginning of the application are fulfilled. Condition 1005 for optimal function is hereby fulfilled, so the function proceeds to point 1006, where it is noted that the BIC-Roam service is activated. The function thus proceeds to point 1007, where it is noted in accordance with barring class 3 from the table in FIG. 9 that incoming calls are allowed to VLRB from exchanges having numbers beginning with +47, +46 705, +46 707, +46 708 or +358 40. GMSCA fulfils this condition, so the function proceeds to points 1008, 1009 and 1010, where VLRB is asked for a roaming number, which is relayed to GMSCA. GMSCA routes the call directly to subscriber B.

The use of optimal routing and of barring of incoming calls outside the home network is not necessary from the viewpoint of the function according to the invention. The allowing of incoming calls from only certain network elements according to the invention may be used also without optimal routing service or such barring of incoming calls which is activated outside the home network. However, combining the invention with these services is a very advantageous embodiment.

The information on that set of allowed network elements from which incoming calls are relayed to their destinations may be defined either solely on a basis of location information or on a basis of both location information and mobile subscriber. The invention is not limited to the manner of storing information on network element sets which is presented in the example shown in FIG. 9. Information may also be stored in other ways than in the form of tables. Any desired number of classes may be defined, e.g. only one class. Routing of incoming calls may be allowed e.g. from all network elements of one operator or one country, e.g. from mobile services switching centres of one operator or in one country. One does not necessarily need to maintain the information shown in FIG. 9 and relating to subscriber B's location and corresponding set of allowed network elements. For example, in the check 1007 of FIG. 10 the comparison is hereby simply between the country codes or country and network codes of subscriber A's network element GMSCA and subscriber B's visitor location register respectively.

The set of allowed network elements may of course also be defined by defining those prohibited network elements, from which incoming calls will not be forwarded to the called subscriber. In this case the set of allowed network elements is in fact the negation of prohibited network elements among all network elements.

The number analysis of addresses of network elements VLRB and GMSCA which is used in the comparison of network elements may also vary in depth. The number analysis is preferably done either at network's country level by analysing only the country code CC or at operator level by checking both the country code CC and the network code NDC.

The analysis according to the invention, which is preferably done in home location register HLR, may be carried out at once when the calling subscriber's network element and the called subscriber's location information (that is, e.g. the address of VLRB) are known. The analysis may also be done at some other stage, e.g. only after call forwardings have been analysed and the final destination number (e.g. the result of a call forwarding done by the called subscriber, that is, the number of subscriber C), to which subscriber B's number has been forwarded redirected, is known.

As is obvious, embodiments of the invention are not limited to the embodiments presented above as examples, but they may vary according to the scope of the attached claims.

What is claimed is:
1. Method of control of calls in a mobile telecommunications network comprising at least, mobile stations and mobile services switching centres and wherein
    connections can be set up between mobile stations and
        mobile services switching centres, mobile services switching centres may set up connections outside the mobile telecommunications network via network elements (GMSCA), information is maintained on a subscriber's location, the method comprising:

determining if calls are barred to a called subscriber when the called subscriber is outside his home network, defining a set of allowed network elements (GMSC) based on subscriber location information, and when a call is set up:

comparing location information of a calling subscriber's network element (GMSCA) with location information of a called subscriber network element (VLRB), comparing location information of a calling subscriber's network element (GMSCA) with the set of allowed network elements (GMSC) relating to the called subscriber's current location, and if calls are barred to a called subscriber when the called subscriber is outside his home network, and if the first comparison shows that the location information of the calling subscriber's network element is the same as the location information of the called subscriber's network element, and if the second comparison shows that the calling subscriber's network element (GMSCA) belongs to the set of allowed network elements (GMSC), then bypassing the said barring of the incoming call and relaying the call to the called subscriber.

2. Method as defined in claim 1, wherein the call is routed between the calling subscriber and the called subscriber using an optimized route not passing by way of the called subscriber's home network, and the call to be routed is set up along the optimised route when the receiving subscriber is outside the home network with barring of incoming calls activated.

3. Method as defined in claim 1, wherein the subscriber's location information is defined as information on a country where the subscriber has done a latest location update.

4. Method as defined in claim 1, wherein the subscriber's location information is defined as information on a network where the subscriber has done a latest location update.

5. Method as defined in claim 1, wherein the subscriber's location information is defined as information on the network element to which the subscriber has done a latest location update.

6. Method as defined in claim 1, wherein the set of allowed network elements (GMSC) is defined on a subscriber basis.

7. Method as defined in claim 1, wherein at least one piece of subscriber information is defined to correspond with several sets of allowed network elements, and the set to be used is chosen on a subscriber basis.

8. Method as defined in clam 1, wherein when comparing location information of the calling subscriber's network element (GMSCA) with the set of allowed network elements (GMSC), a country code of the network element is studied.

9. Method as defined in claim 1,wherein when comparing location information of the calling subscriber's network element (GMSCA) with the set of allowed network elements (GMSC), network code of the network element is studied.

10. Method as defined in claim 1, wherein the set of allowed network elements is the set of mobile services switching centres of the network corresponding to the location information.

11. Method as defined in claim 1, wherein the set of allowed network elements is a set of mobile services switching centres of a country corresponding to the location information.

12. Method as defined in claim 1, wherein the called subscriber may also forward calls directed to the called subscriber, to the number of a third subscriber, wherein an analysis of whether the calling subscriber's network element (GMSCA) belongs to the set of allowed network elements (GMSC) is done only after the third subscriber's number is known to which the called subscriber's number has been forwarded.

13. Method as defined in claim 1, wherein the mobile telecommunications network is in accordance with the GSM system.

14. Mobile telecommunications network comprising at least mobile stations, mobile services switching centres and the subscriber's home location register comprising storing equipment for storing location information of the mobile subscriber, the mobile switching centres being able to set up connections outside the mobile telecommunications network via network elements.

wherein the network comprises storing equipment for storing information on a set of allowed network elements (GMSC) based on the subscriber's location information, determining equipment for determining if calls are barred to a called subscriber when the called subscriber is outside his home network, first comparing equipment for comparing location information of a calling subscriber's network element (GMSCA) with location information of a called subscriber's network element (VLRB), second comparing equipment for comparing location information of the calling subscriber's network element (GMSCA) with a set of allowed network elements (GMSC) relating to the called subscriber's current location, and bypassing equipment for bypassing the barring and relaying the incoming call to the called subscriber, if comparison by the first comparing equipment shows that the location information of the calling subscriber's network element is the same as the location information of the called subscriber's network element, and if comparison by the second comparing equipment shows that the calling subscriber's network element (GMSCA) belongs to the set of allowed network elements (GMSC).

15. Home location register of a mobile telecommunications network where information is stored on the location of the mobile subscriber, mobile switching centres of the mobile telecommunication network being able to set up connections outside the mobile telecommunications network via network elements, wherein the home location register comprises storing equipment for storing information on a set of allowed network elements (GMSC) based on the subscriber's location information, determining equipment for determining if calls are barred to a called subscriber when the called subscriber is outside his home network, first comparing equipment for comparing location information of a calling subscriber's network element with location information of a called subscriber's network element, second comparing equipment for comparing location information of the calling subscribers network element (GMSCA) with a set of allowed network elements (GMSC) relating to the called subscriber's current location, and bypassing equipment for bypassing the said barring and relaying the incoming call to the called subscriber, if comparison by the first comparing equipment shows that the location information of the calling subscriber's network element is the same as the location information of the called subscriber's network element, and if comparison by the second comparing equipment shows that the calling subscriber's network (GMSCA) belongs to a set of allowed network elements (GMSC).

* * * * *